(12) United States Patent
Shultz

(10) Patent No.: US 6,307,830 B1
(45) Date of Patent: Oct. 23, 2001

(54) PROTECTED RECORDING MEDIUM

(76) Inventor: Bradley Shultz, 39191 River Rd., Lebanon, OR (US) 97355

( * ) Notice: Subject to any disclaimer, the term of this patent is extended or adjusted under 35 U.S.C. 154(b) by 0 days.

(21) Appl. No.: 09/089,061

(22) Filed: Jun. 2, 1998

(51) Int. Cl.[7] ................................................ G11B 7/24
(52) U.S. Cl. ............................................................ 369/281
(58) Field of Search .................................. 369/281, 280, 369/282, 291; 360/131, 133

(56) References Cited

U.S. PATENT DOCUMENTS

| | | | |
|---|---|---|---|
| 1,288,610 | * 12/1918 | Jones | 369/281 |
| 2,092,668 | * 9/1937 | Goldsmith | 369/281 X |
| 2,544,010 | * 3/1951 | Giannantonio | 369/281 |
| 2,559,786 | * 7/1951 | Mueller | 369/281 X |
| 2,592,026 | * 4/1952 | Guboff | 369/281 |
| 3,540,737 | * 11/1970 | Borthwick | 369/281 |
| 4,316,281 | 2/1982 | Prusak | 369/291 |
| 4,589,104 | 5/1986 | Brockley | 369/291 |
| 4,736,840 | 4/1988 | Deiglmeier | 206/313 |
| 5,299,186 | 3/1994 | Tsurushima | 369/291 |
| 5,480,743 | * 1/1996 | McCarter et al. | 429/96 |

FOREIGN PATENT DOCUMENTS 60-246039  * 12/1985 (JP) ................................ 369/280

* cited by examiner

*Primary Examiner*—David L. Ometz
(74) *Attorney, Agent, or Firm*—William S. Lovell; S. Rose Jade

(57) ABSTRACT

A protected recording medium generally in the form of a disk and in one embodiment corresponding to a compact disk (CD) is provided with an annular spacer on one side thereof near the periphery thereof that will elevate an exposed downward recordable region of the medium far enough above a flat surface onto which the medium is placed to avoid contact with dust and dirt on that surface. The "upper" surface of the medium is also provided with an annular groove at a radial position corresponding to that of the spacer just noted, whereby two or more such protected recording media can be stacked one upon the other such that lateral movement of one relative to the other will be precluded. In the case of mechanically recorded media such as an LP in which the recording region is ordinarily on the top of the disk, that same structure will similarly preclude a bottom surface of an LP (which may or may not have been recorded upon) from making direct contact with an upper surface (typically recorded upon) of a second such LP when the one is stacked upon the other.

4 Claims, 2 Drawing Sheets

PROTECTED RECORDING MEDIUM

BACKGROUND OF THE INVENTION

1. Field of the Invention

This invention relates to recording media having a recordable region therein that is protected from surface damage, and more particularly to recording media wherein the protection afforded does not require the user to add any packaging or apparatus to, or remove packaging or apparatus from, the recording medium in order for that protected recording medium to be recorded upon, read, transported or stored.

2. Background Information

Recording media come in a variety of shapes. Well-known examples in the art include the compact disc (CD) and the vinyl or plastic stereo record (LP). The medium of such CDs and LPs presents a portion of at least one face of a flat circular disc (hereinafter referred to as the recordable region) to be recorded upon and subsequently read (by a laser in the case of CDs or a stylus needle in the case of LPs). Recording onto the recordable region of the medium is done by techniques that produce a microstructure within the medium (pits in the case of CDs; grooves in the case of LPs). This recordable region, and any microstructure recorded upon it, are and remain vulnerable to surface damage throughout the life of the medium. Any material that would adhere to, scratch or otherwise distort the face of, or any microstructure recorded upon the face of, the recordable region would also reduce the recordability and/or readability of that recording medium.

During handling of the medium, users may touch the exposed recordable region and leave oily fingerprints and grime thereon. Also, users may cause the recordable region to be placed upon flat surfaces that bear a quantity of dust, dirt, and the like that can easily attach to the recordable region via static electrical attraction, or by becoming embedded in the oily residue of a fingerprint. Once attached, the dust and dirt may scratch, mar or otherwise distort the blank or pre-recorded recordable region, especially when placed against a hard rotating surface such as occurs when the media are stacked upon each other in an apparatus which rotates when reading the medium. Due to the cost of recording media (whether sold as blank or pre-recorded), effort has been made to develop means for protecting such recording media from common types of accidental damage incurred by improper handling, stacking, transport and storage.

Well known devices for protecting recording media during long-term storage are sleeves and boxes. See, e.g., U.S. Pat. No. 4,736,840 issued Apr. 12, 1988 to Deigimeier describing a protective circular envelope into which the CD may be inserted for storage but which must be removed prior to reading; U.S. Pat. No. 5,299,186 issued Mar. 29, 1994 to Tsurushima describes a CD protective cover that is installed about the CD for storage but which likewise must be removed for reading.

Stacking devices for separating stacked recording media during reading are also known to the art. See, e.g., U.S. Pat. No. 4,589,104 issued May 13, 1986 to Brockley that describes a spacer apparatus into which LPs may be loaded; and U.S. Pat. No. 4,316,281 issued Feb. 16, 1982 to Prusak, describes a spacer for video discs which are stacked one above the other.

Recognizing the need for a protective device that can remain essentially a permanent part of a particular medium for protective purposes, while also allowing the reading of that medium with that protective device in place, on Dec. 20, 1996, the present inventor filed U.S. patent application Ser. No. 08/771,011 that describes a flexible, annular protector ring having an annular spacer extending therefrom, that protector ring then being snapped around the edge of a recording disc so as to provide a spacer that will maintain the lower-side recordable region thereof out of contact with a surface upon which the medium may be placed. An annular groove disposed on the upper surface of that protector ring in a corresponding position can be engaged by a second such disc-protector ring combination, thereby permitting two or more such disc-protector ring combinations to be stacked one upon the other so as to preclude relative sliding motion therebetween.

It has also occurred to the present inventor, however, that there remains a need for a recording medium that is protected but which does not require the user to add a protective apparatus to such medium, move the medium into a separate protecting apparatus, or to add a protecting apparatus to a reader of the medium. The present specification and drawings disclose such a protected recording medium, specifically by adopting the aforesaid annular spacer not as a part of an added protective apparatus but rather as an integral part of the recording disc itself.

SUMMARY OF THE INVENTION

The invention comprises a protected recording medium consisting essentially of a circular disc including on one side thereof a recordable region and an annular protective spacer disposed within a peripheral, non-recordable region. The protective spacer is adequate to hold the recordable region out of contact with an adjacent hard surface such as a table top. An annular groove disposed in a corresponding location atop the recording medium permits the stacking of two or more protected recording media one atop the other during handling, storage, or transport.

BRIEF DESCRIPTION OF THE DRAWINGS

The preferred embodiments of the invention will now be described in detail with reference to the accompanying drawings, in which.

DETAILED DESCRIPTION OF THE INVENTION

Figure 1:
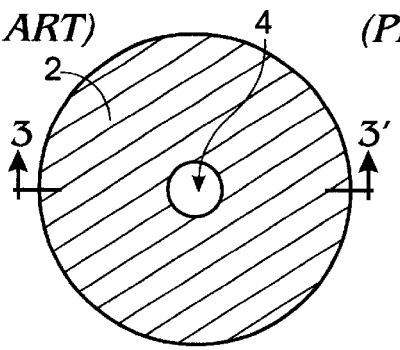
FIG. 1 is a top plan view of a disc-like recording medium from the prior art.
Figure 2:
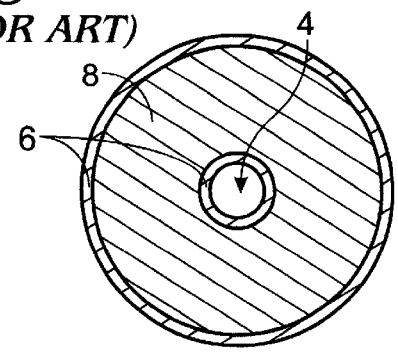
FIG. 2 is a bottom plan view of the recording medium of FIG. 1.
Figure 3:
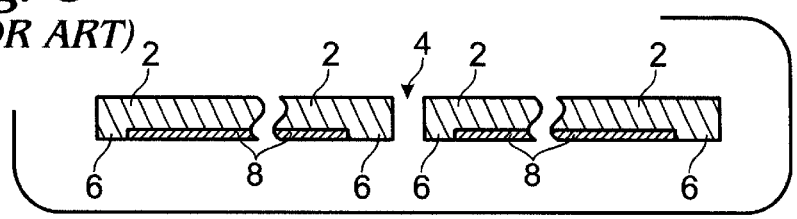
FIG. 3 is a transverse cross-sectional view of the recording medium of FIGS. 1–2 taken along the lines 3–3' of FIG. 1, but exaggerated in thickness for purposes of clarity in the drawing.

FIG. 1 is a top plan view of a disc-like recording medium from the prior art, showing essentially a top surface 2 and a central spindle aperture 4. FIG. 2 is a bottom plan view of the recording medium of FIG. 1 showing aperture 4, a non-recordable region 6 annularly distributed both about aperture 4 and the disc periphery. Between such non-recordable regions 6 there is shown a recordable region 8 that encompasses the greater portion of the bottom of the disc. In FIG. 3, the medium of FIGS. 1 and 2 is shown in cross-section taken along the line 3–3' of FIG. 1, in which like numerals represent like elements but in vertically exaggerated form so as to illustrate the placement of recordable region 8 within the planar surface of the medium.

Figure 4:
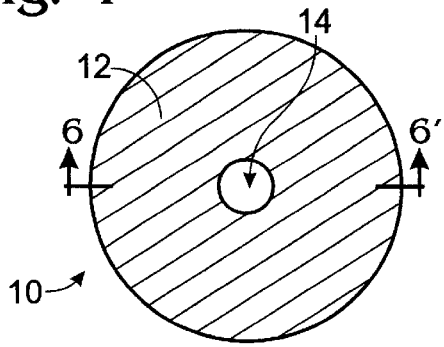
FIG. 4 is a top plan view of a disc-like recording medium comprising one embodiment of the invention.
Figure 5:
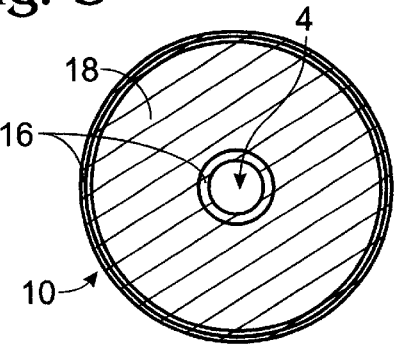
FIG. 5 is a bottom plan view of the recording medium of FIG. 4.

FIG. 4 is now a top plan view of a disc-like Protected Recording Medium (hereinafter referred to as PRM) 10 comprising one embodiment of the invention that includes a top surface 12 and a spindle aperture 14, and from this perspective PRM is seen to be indistinguishable from the prior art medium of FIGS. 1–3. FIG. 5 is a bottom plan view of the recording medium of FIG. 4, having now a non-recordable region 16 again disposed about both the spindle aperture 14 and the periphery of the medium, a recordable region 18 that again encompasses most of the area of that bottom side, but also including an annular spacer 20.

Figure 6:
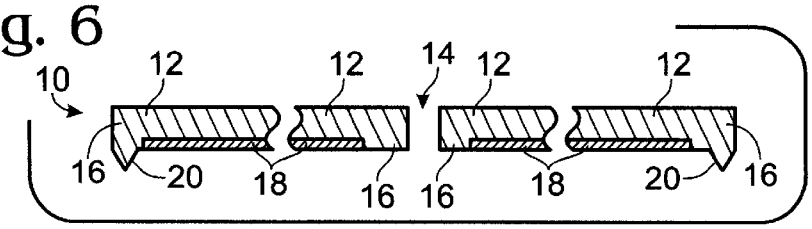
FIG. 6 is a transverse cross-sectional view of the recording medium of FIGS. 4–5 taken along the lines 6–6' of FIG. 4, but exaggerated in thickness for purposes of clarity in the drawing and showing a protective spacer.

The structure of spacer 20, which is preferably of a "V" shape in cross-section, is better seen in FIG. 6 which is a transverse cross-sectional view of PRM 10 of FIGS. 4–5 taken along the lines 6–6' of FIG. 4, in which like numerals again refer to like elements and the drawing is again exaggerated in thickness for purposes of clarity. More particularly, spacer 20 is seen to comprise an annular, downwardly descending extension of height "h" of the outer non-recordable region of medium 10. Spacer 20 could well be of rectangular or rounded shape in cross-section, but a "V" shape is preferred for purposes of cooperation with another medium in an alternative embodiment of the invention as will be discussed below. Extension height "h" is in the sub-millimeter range, but is predetermined to exceed the size of typical dust particles, the thickness of fingerprints, and generally the dimensions of various types of grime that may have been deposited onto desk tops or other such flat surfaces onto which PRM 10 may be placed. At the same time, height "h" cannot be so great as to place the reading of data within recording recordable region 18 beyond the reading capability of the appropriate reading device, whether a laser reader or turntable and stylus needle, into or onto which PRM 10 has been installed, but that limit can easily be established by a person of ordinary skill in the art. When a PRM 10 that happens to be a CD is placed on a flat surface, the effect of spacer 20 is thus to place recordable region 18 above such grime or dust particles and the like and thereby to prevent the same from inflicting physical damage on recordable region 18. If PRM 10 happens to be an LP, it will typically be disposed with recordable region 18 direct upwardly (i.e., FIG. 6 would be turned upside down), and similar protection is provided as to flat surfaces (such as another PRM 10 that is an LP) that may be placed atop that PRM 10.

Figure 7:
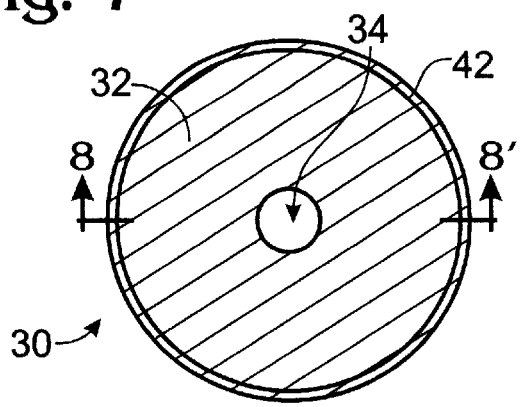
FIG. 7 is a top plan view of a disc-like recording medium comprising a second embodiment of the invention including an annular groove about the periphery thereof.

FIG. 7 now shows a top plan view of a disc-like recording medium comprising a second embodiment of the invention, designated as PRM 30 and including a top surface 32 and a central spindle aperture 34. Also shown is an annular groove or slot 42 that will be shown and described in greater detail in FIG. 8.

Figure 8:
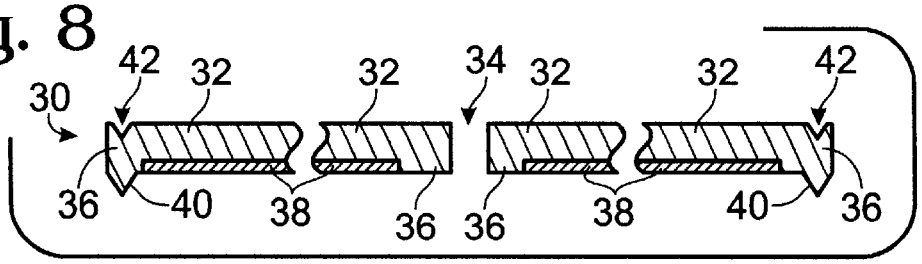
FIG. 8 is a transverse cross-sectional view of the recording medium of FIG. 7 taken along the lines 8–8' of FIG. 7, but exaggerated in thickness for purposes of clarity in the drawing and showing both a protective spacer and an annular groove.

FIG. 8 is a transverse cross-sectional view of PRM 30 of FIG. 7, taken along the lines 8–8' of FIG. 7 and in which like numerals again refer to like elements but lo the drawing is again exaggerated in thickness for purposes of clarity. PRM 30 includes on the lower side thereof a non-recordable region 36 distributed annularly about spindle aperture 34 and around the periphery of PRM 30, a recordable region 38 distributed between such non-recordable regions 36, and a spacer 40 distributed annularly near to the periphery of PRM 30. Annular groove 42, which is preferably "V" shaped in the manner of spacer 40, is disposed atop PRM 30 at a location near to the periphery thereof that corresponds to the location of spacer 40 on the bottom surface of PRM 30. Of course, spacer 40 and groove 42 can again be U-shaped, rectangular or of any similar such shape so long as the shapes are "mated," i.e., groove 42 is adapted to accept spacer 40 and thereby to prevent lateral movement of one medium relative to another when the same are placed one atop the other.

Figure 9:
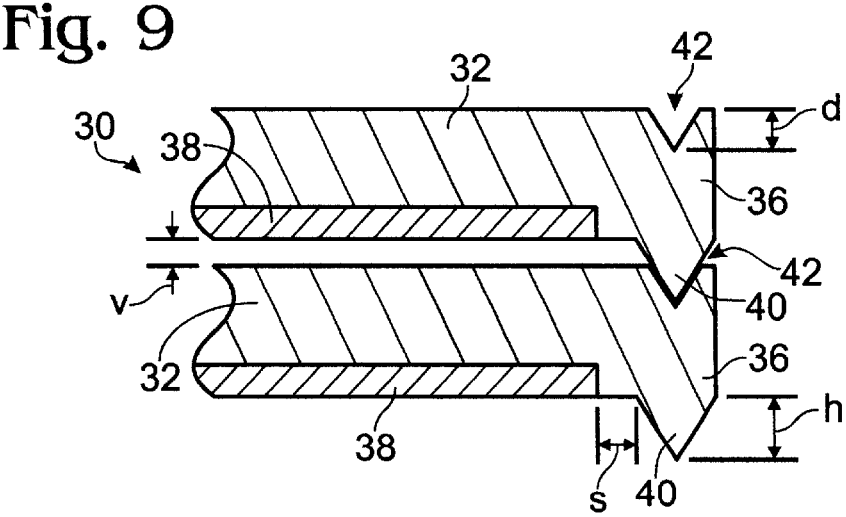
FIG. 9 is an enlarged view in cross-section of outer portions of two of the media of FIGS. 7–8 illustrating the stacking of one upon the other.

As also shown in FIG. 8, groove 42 has a depth "d" wherein "d"<"h" in an amount that will yield a space "v" between the lower side of one PRM 30 and the upper side of another PRM (designated as 30') onto which that first such PRM 30 is placed in the manner shown in the enlarged, cross-sectional view of corresponding ends of two such PRMs in FIG. 9. It is again advantageous for the dimension "v" to be established (by the dimensions "h" and "d") so as to be larger than the anticipated dimensions of dust and dirt particles, from the damaging effects of which recording region 38 is to be protected.

Also shown in FIG. 9 is a separation distance "s" by which spacer 40 is removed from recording region 38, i.e., spacer 40 is disposed at some convenient distance (shown as distance "i" in FIG. 9) from the periphery of PRM 30 (and groove 42 is disposed at that same distance "i" as previously indicated), but from the indicated distance "s" it can be seen that spacer 40 is not permitted to encroach upon recording region 38.

Again, in the event that PRM 30 happens to be an LP instead of a CD, it will be the placing of flat surfaces atop such a PRM 30 that might subject recordable region 38 thereof to damage, and the corresponding effect of spacer 40 and groove 42 in combination would be shown by viewing FIGS. 8–9 turned upside down.

It will be understood by those of ordinary skill in the art that other arrangements and disposition of the aforesaid components, the descriptions of which are intended to be illustrative only and not limiting, may be made without departing from the spirit and scope of the invention, which must be identified and determined only from the following claims and equivalents thereof.

I claim:

1. A protected recording medium comprising:
    a planar, circular disc including a circular central aperture;
    an annular recordable region disposed radially outward from said central aperture on a first side of said disc;
    a first annular non-recordable region disposed between said central aperture and said recordable region;
    a second annular non-recordable region disposed radially outwardly from said recordable region; and
    an annular spacer having a predetermined height and a predetermined cross-sectional shape disposed within said second annular non-recordable region at a first radial distance from said central aperture and extending normally to the plane of said disc; and an annular groove having a predetermined depth and a predetermined cross-sectional shape disposed on a second side of said disc opposite said first side, and radially outwardly from said central aperture at a second radial distance therefrom approximately corresponding to said first radial distance; and wherein said predetermined height of said annular spacer is greater than said predetermined depth of said annular groove, whereby two or more instances of said protected recording medium can be placed one atop the other in a stacking manner so as to leave a predetermined separation distance therebetween.

2. The protected recording medium of claim 1 wherein said predetermined cross-sectional shape of said groove corresponds in shape to said predetermined cross-sectional shape of said spacer.

3. The protected recording medium of claim 1 wherein said annular spacer is V-shaped in cross-section.

4. The protected recording medium of claim 1 wherein said annular groove is V-shaped in cross-section.

* * * * *